United States Patent
Xu et al.

(10) Patent No.: US 10,922,782 B2
(45) Date of Patent: Feb. 16, 2021

(54) MAPPING VERTICES FROM AN EARTH MODEL TO A 2D ARRAY

(71) Applicant: Landmark Graphics Corporation, Houston, TX (US)

(72) Inventors: Zitao Xu, Katy, TX (US); Genbao Shi, Sugar Land, TX (US); ChiKang David Chien, Sugar Land, TX (US); Maurice Gehin, Missouri City, TX (US); Andres Cesar Callegari, Cypress, TX (US); Jeffrey Marc Yarus, Houston, TX (US)

(73) Assignee: LANDMARK GRAPHICS CORPORATION, Houston, TX (US)

(*) Notice: Subject to any disclaimer, the term of this patent is extended or adjusted under 35 U.S.C. 154(b) by 124 days.

(21) Appl. No.: 16/340,029

(22) PCT Filed: Dec. 16, 2016

(86) PCT No.: PCT/US2016/067107
§ 371 (c)(1),
(2) Date: Apr. 5, 2019

(87) PCT Pub. No.: WO2018/111296
PCT Pub. Date: Jun. 21, 2018

(65) Prior Publication Data
US 2020/0043131 A1    Feb. 6, 2020

(51) Int. Cl.
*G06K 9/32* (2006.01)
*G06T 3/00* (2006.01)
*G06T 1/60* (2006.01)
*G06T 11/40* (2006.01)

(52) U.S. Cl.
CPC .............. *G06T 3/0037* (2013.01); *G06T 1/60* (2013.01); *G06T 11/40* (2013.01)

(58) Field of Classification Search
CPC ........... G06T 7/30; G06T 3/00; G06T 3/0093; G06T 7/344; G06T 3/0031; G06T 3/0037; G06T 3/0043; G06T 1/60; G06T 11/40; G06T 11/20; G06T 17/05
See application file for complete search history.

(56) References Cited

U.S. PATENT DOCUMENTS

| 6,389,289 B1 | 5/2002 | Voce et al. |
| 7,415,356 B1 | 8/2008 | Gowda et al. |
| 8,635,052 B1* | 1/2014 | Mallet ..................... G06T 17/05 703/10 |
| 2009/0123088 A1 | 5/2009 | Kallay et al. |
| 2012/0105702 A1 | 5/2012 | Kogure |

FOREIGN PATENT DOCUMENTS

JP    2009059100 A    9/2010

OTHER PUBLICATIONS

International Search Report and Written Opinion; PCT Application No. PCT/US2016/067107; dated Aug. 30, 2017.
English Abstract of JP2009-059100 from www.espacenet.com, Sep. 24, 2010.

* cited by examiner

*Primary Examiner* — Duy M Dang
(74) *Attorney, Agent, or Firm* — Polsinelli PC

(57) ABSTRACT

Systems and methods for mapping vertices from one coordinate system in an earth model to another coordinate system in a two-dimensional (2D) array without disrupting the topology of the vertices.

20 Claims, 7 Drawing Sheets

MAPPING VERTICES FROM AN EARTH MODEL TO A 2D ARRAY

CROSS-REFERENCE TO RELATED APPLICATIONS

This application is a national stage entry of PCT/US2016/067107 filed Dec. 16, 2016, said application is expressly incorporated herein in its entirety.

FIELD OF THE DISCLOSURE

The present disclosure generally relates to systems and methods for mapping vertices from an earth model to a two-dimensional (2D) array. More particularly, the present disclosure relates to mapping vertices from one coordinate system in an earth model to another coordinate system in a two-dimensional (2D) array without disrupting the topology of the vertices.

BACKGROUND

Building an earth model grid with reverse faults is difficult to the extent that an index of overlapped cells is desired in earth model global grid, which models both geometry and topology in the age before faulting. The problem may be generally defined as how to map vertices from one coordinate system in an earth model to another coordinate system in a two-dimensional (2D) array without disrupting the topology of the vertices. Conventional techniques are available that address the problem, however, are time consuming and produce results that are less than desirable with large data sets.

One technique involves region expansion and area preservation. The region expansion approach expands regions in the earth model with a dense mesh/grid and shrinks those regions with a coarse mesh/grid so that the total area covered by all regions is maintained (i.e. each mesh/grid is more even). This approach appears reasonable in theory, but is challenging to implement. Another technique utilizes a large equation system. The large equation system approach expands small cells in the earth model and shrinks large cells in the earth model by setting up a large equation system to solve. The large equation system could be huge if the number of cells is large and is also challenging to implement.

BRIEF DESCRIPTION OF THE DRAWINGS

The present disclosure is described below with references to the accompanying drawings in which like elements are referenced with like reference numerals, and in which.

DETAILED DESCRIPTION OF THE PREFERRED EMBODIMENTS

Figure 1A:
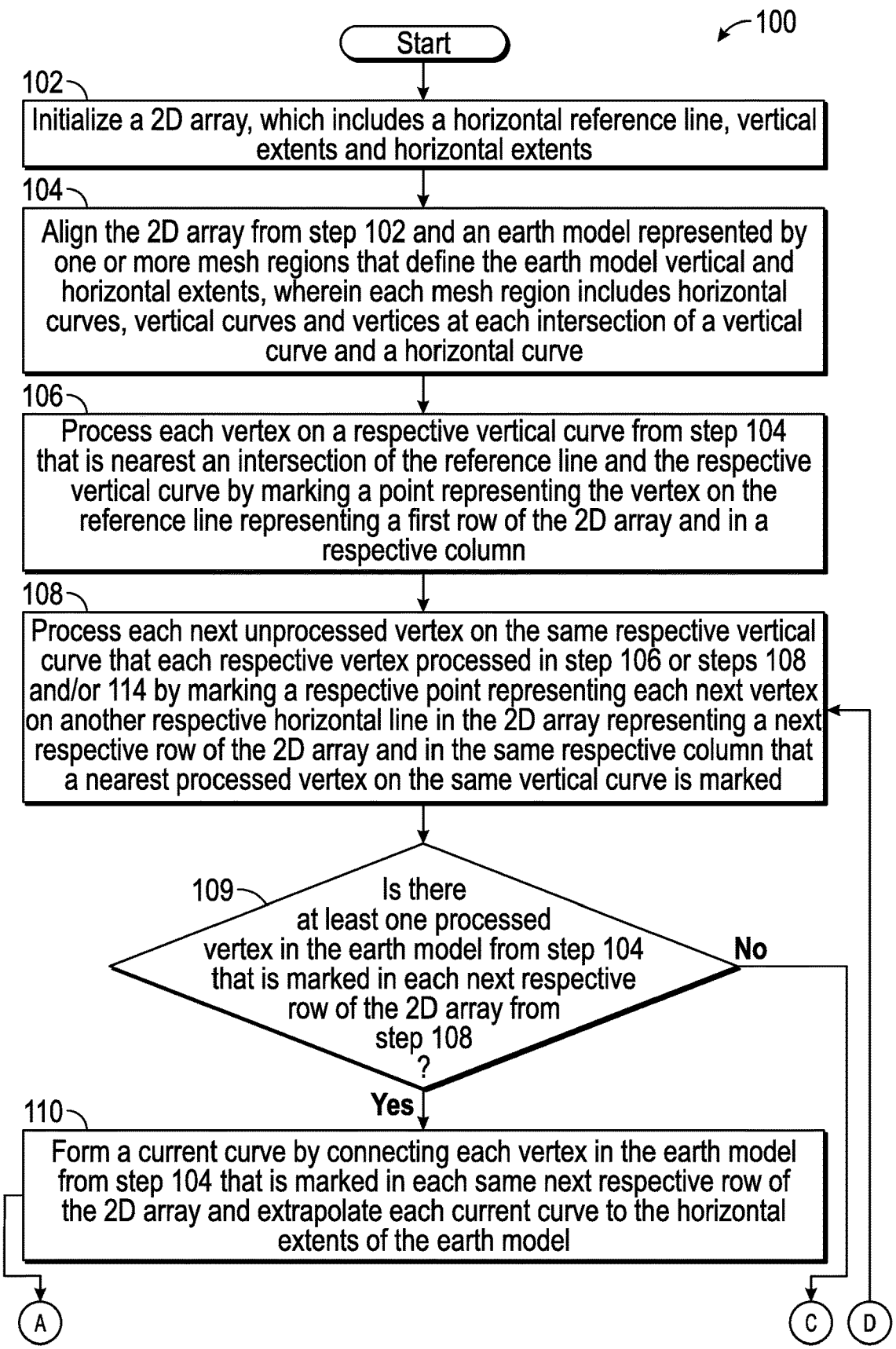
FIGS. 1A-1B are a flow diagram illustrating one embodiment of a method for implementing the present disclosure.

The present disclosure overcomes one or more deficiencies in the prior art by mapping vertices from one coordinate system in an earth model to another coordinate system in a 2D array without disrupting the topology of the vertices.

In one embodiment, the present disclosure includes a method for mapping vertices from an earth model to a 2D array, comprising, a) aligning the earth model and the 2D array, wherein the earth model comprises a plurality of horizontal curves, a plurality of vertical curves and vertices at each intersection of a vertical curve and a horizontal curve; b) processing each vertex on a respective vertical curve that is nearest an intersection of a horizontal reference line in the 2D array and the respective vertical curve by making a point representing the vertex on the reference line, which represents a first row of the 2D array, and in a respective column; c) processing each next unprocessed vertex on the respective vertical curve that each respective vertex was processed in one of step (b) and at least one of steps (c) and (e) by marking a respective point representing each next vertex on another respective horizontal line in the 2D array, which represents a next respective row of the 2D array, and in the respective column that a nearest processed vertex on the respective vertical curve is marked; d) forming at least one current curve; e) processing each unprocessed vertex between each respective current curve and the reference line by marking a respective point representing each unprocessed vertex on the another respective horizontal line in the 2D array on which the vertices processed in one of steps (b) and step (c) on a same side of the reference line are marked, at a unique position; f) reducing an amount of computer memory required to store the 2D array by optimizing a spacing between the vertices marked in each another respective horizontal line from steps (c) and (e) with an empty column; and g) repeating steps (c) through (f) using a computer processor until there are no more unprocessed vertices.

In another embodiment, the present disclosure includes a non-transitory program carrier device tangibly carrying computer executable instructions for program carrier device tangibly carrying computer executable instructions for mapping vertices from an earth model to a 2D array, the instructions being executable to implement; a) aligning the earth model and the 2D array, wherein the earth model comprises a plurality of horizontal curves, a plurality of vertical curves and vertices at each intersection of a vertical curve and a horizontal curve; b) processing each vertex on a respective vertical curve that is nearest an intersection of a horizontal reference line in the 2D array and the respective vertical curve by marking a point representing the vertex on the reference line, which represents a first row of the 2D array, and in a respective column; c) processing each next unprocessed vertex on the respective vertical curve that each respective vertex was processed in one of step (b) and at least one of steps (c) and (e) by marking a respective point representing each next vertex on another respective horizontal line in the 2D array, which represents a next respective row of the 2D array, and in the respective column that a nearest processed vertex on the respective vertical curve is marked; d) forming at least one current curve; e) processing each unprocessed vertex between each respective current curve and the reference line by marking a respective point representing each unprocessed vertex on the another respective horizontal line in the 2D array on which the vertices processed in one of steps (b) and step (c) on a same side of the reference line are marked, at a unique position; f) reducing an amount of computer memory required to store the 2D array by optimizing a spacing between the vertices marked in each another respective horizontal line from steps (c) and (e) with an empty column; and g) repeating steps (c) through (f) using a computer processor until there are no more unprocessed vertices.

In yet another embodiment, the present disclosure includes a non-transitory program carrier device tangibly carrying computer executable instructions for mapping vertices from an earth model to a 2D array, the instructions being executable to implement; a) aligning the earth model and the 2D array by positioning the 2D array over the earth model so that each vertical extent and each horizontal extent of the 2D array is nearest to each respective vertical extent and each respective horizontal extent of the earth model for mapping vertices from an earth model to a 2D array, wherein the earth model comprises a plurality of horizontal curves, a plurality of vertical curves and vertices at each intersection of a vertical curve and a horizontal curve; b) processing each vertex on a respective vertical curve that is nearest an intersection of a horizontal reference line in the 2D array and the respective vertical curve by marking a point representing the vertex on the reference line, which represents a first row of the 2D array, and in a respective column; c) processing each next unprocessed vertex on the respective vertical curve that each respective vertex was processed in one of step (b) and at least one of steps (c) and (e) by marking a respective point representing each next vertex on another respective horizontal line in the 2D array which represents a next respective row of the 2D array, and in the respective column that a nearest processed vertex on the respective vertical curve is marked; d) forming at least one current curve; e) processing each unprocessed vertex between each respective current curve and the reference line by marking a respective point representing each unprocessed vertex on the another respective horizontal line in the 2D array on which the vertices processed in one of steps (b) and step (c) on a same side of the reference line are marked, at a unique position; f) reducing an amount of computer memory required to store the 2D array by optimizing a spacing between the vertices marked in each another respective horizontal line from steps (c) and (e) with an empty column; g) repeating steps (c) through (f) using a computer processor until there are no more unprocessed vertices.

The subject matter of the present disclosure is described with specificity, however, the description itself is not intended to limit the scope of the disclosure. The subject matter thus, might also be embodied in other ways, to include different structures, steps and/or combinations similar to and/or fewer than those described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the present disclosure may be described with respect to the oil and gas industry, it is not limited thereto and may also be applied in other industries (e.g. drilling water wells) to achieve similar results.

Method Description

Figure 1B:
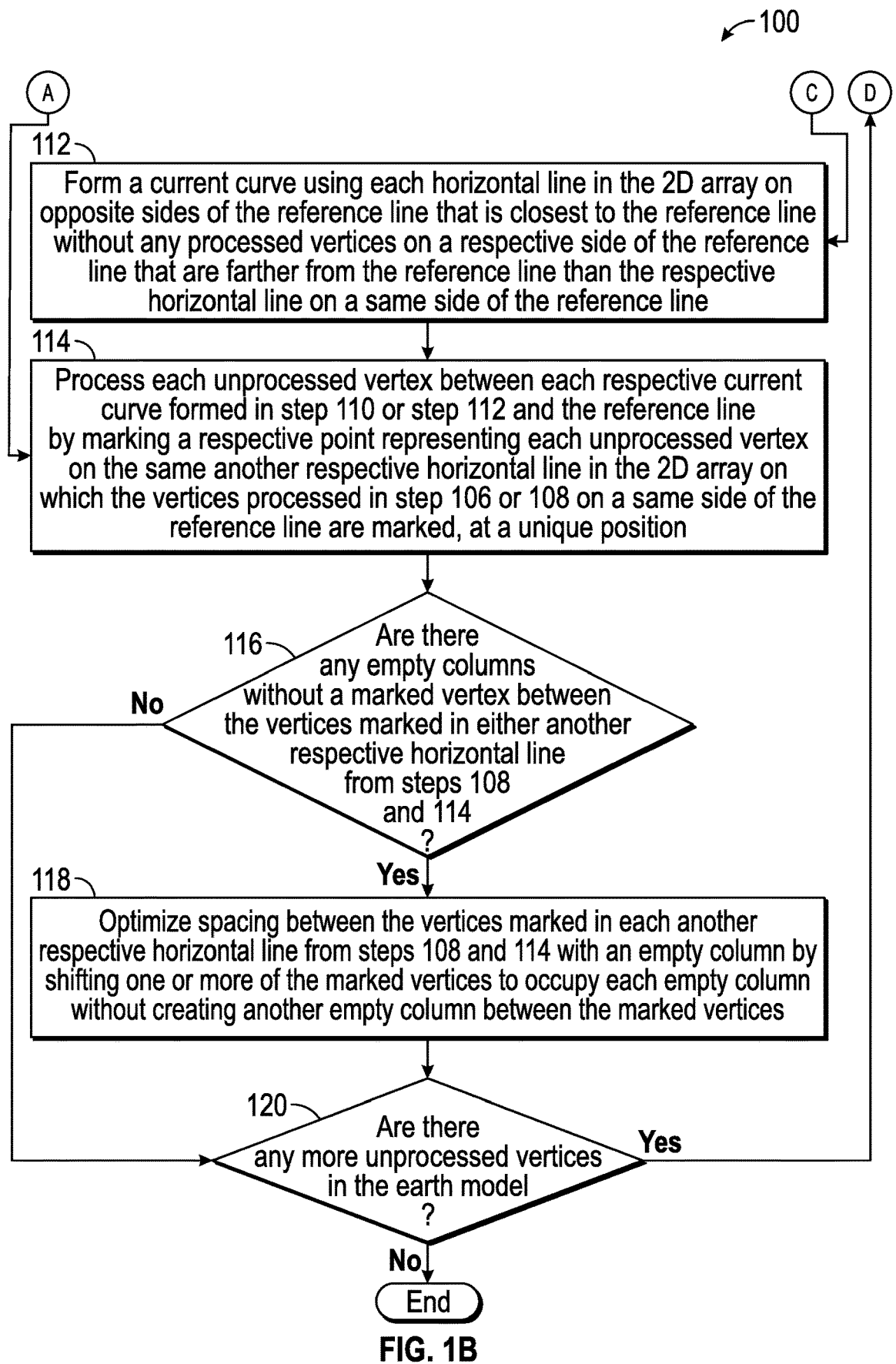

Referring now to FIGS. 1A-1B, a flow diagram illustrates one embodiment of a method 100 for implementing the present disclosure.

In step 102, a 2D array representing a grid is initialized using techniques well-known in the art. The 2D array includes a horizontal reference line, vertical extents and horizontal extents. The 2D array is preferably based on a world coordinate system. The grid spacing for the 2D array may be predetermined based on the earth model.

In step 104, the 2D array initialized in step 102 is aligned with an earth model represented by one or more 2D mesh regions that define vertical extents and horizontal extents of the earth model. Each mesh region includes horizontal curves, vertical curves and vertices at each intersection of a vertical curve and a horizontal curve. The boundaries of each mesh region are not included in the horizontal and vertical curves. Each vertex in the earth model represents the location of well log data, seismic data or data interpolated from well log data or seismic data that is acquired from sensors and used to measure porosity, permeability and/or other attributes. Vertices in each mesh region are locally regular: they are in rows and columns, but their geometry is warped. There is neither gap nor overlap between mesh regions. The earth model and the 2D array may be aligned by positioning the 2D array over the earth model so that each vertical extent and each horizontal extent of the 2D array is nearest to each respective vertical extent and each respective horizontal extent of the earth model. The earth model is preferably based on an image coordinate system. And, the horizontal reference line in the 2D array serves the following purposes: i) it intersects a set of vertical curves in the earth model across multiple mesh regions, which form a unique sequence; ii) each vertical curve has one intersection point so it can identify the closest vertex; and iii) this ordered vertex sequence defines a base relation between different mesh regions.

In step 106, each vertex on a respective vertical curve from step 104 that is nearest an intersection of the reference line and the respective vertical curve is processed by marking a point representing the vertex on the reference line, which represents a first row of the 2D array, and in a respective column.

In step 108, each next unprocessed vertex on the same respective vertical curve that each respective vertex was processed in step 106 or steps 108 and/or 114 is processed by marking a respective point representing each next vertex on another respective horizontal line in the 2D array representing a next respective row of the 2D array and in the same respective column that a nearest processed vertex on the same respective vertical curve is marked.

In step 109, the method 100 determines if there is at least one processed vertex in the earth model from step 104 that is marked in each next respective row of the 2D array from step 108. If there is not at least one processed vertex in the earth model that is marked in each next respective row of the 2D array, then the method 100 proceeds to step 112. Otherwise, the method proceeds to step 110.

In step 110, a current curve is formed by connecting each vertex in the earth model from step 104 that is marked in each same next respective row of the 2D array and extrapolating each current curve to the horizontal extents of the earth model. The method 100 proceeds to step 114.

In step 112, a current curve is formed using each horizontal line in the 2D array on opposite sides of the reference line that is closest to the reference line without any processed vertices on a respective side of the reference line that are farther from the reference line than the respective horizontal line on a same side of the reference line.

In step 114, each unprocessed vertex between each respective current curve formed in step 110 or step 112 and the reference line is processed by marking a respective point representing each unprocessed vertex on the same another respective horizontal line in the 2D array on which the vertices processed in step 106 or 108 on a same side of the reference line are marked, at a unique position.

In step 116, the method 100 determines if there are any empty columns without a marked vertex between the vertices marked in either another respective horizontal line from steps 108 and 114. If there are not any empty columns without a marked vertex between the vertices marked in either another respective horizontal line from steps 108 and 114, then the method 100 proceeds to step 120. Otherwise, the method 100 proceeds to step 118.

In step 118, a spacing between the vertices marked in each another respective horizontal line from steps 108 and 114 with an empty column is optimized by shifting one or more of the marked vertices to occupy each empty column without creating another empty column between the marked vertices. The one or more of the marked vertices may be shifted to occupy the nearest empty column without creating another empty column between the marked vertices. If there are any remaining empty columns, then one or more of the marked vertices may be shifted using a minimum sum of weighted geometric distortion. In this manner, the amount of computer memory required to store the 2D array is reduced. A minimum sum of weighted geometric distortion may be defined as a minimum sum of weighted Euclidean distances using the following equation:

$$d_{min} = W_o \sum_i |U_i - L_i| + W_r \sum_j |U_j - L_j| \quad (1)$$

where $|U_k - L_k|$ is Euclidean distance between two vertices whose corresponding mark-pair is in an Upper and Lower row at column k. $i \in O$; $j \in R$, and O is index set of Originally matched mark-pairs, and R is an index set of the Rest mark pairs $W_o$ and $W_r$ are weight coefficients.

In step 120, the method 100 determines if there are any more unprocessed vertices in the earth model. If there are more unprocessed vertices in the earth model, then the method 100 returns to step 108. Otherwise, the method 100 ends.

Figure 2:
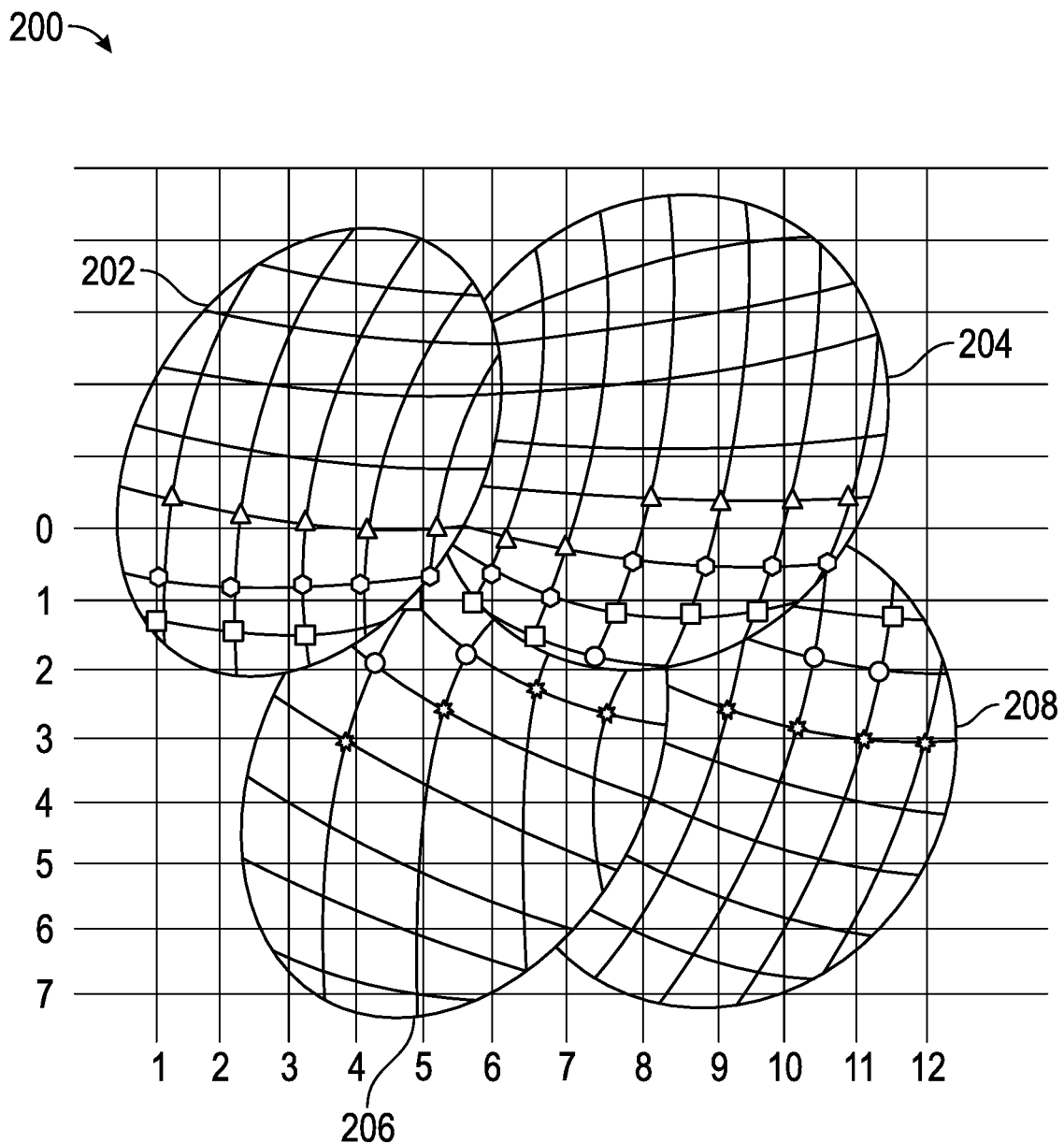
FIG. 2 is a 2D array aligned with an earth model represented by four mesh regions that illustrates step 104 in FIG. 1A.

Referring now to FIGS. 2-9, the method 100 is applied to map vertices from one coordinate system in an exemplary earth model to another coordinate system in a 2D array without disrupting the topology of the vertices. In FIG. 2, a 2D array 200 is aligned with an earth model represented by four mesh regions 202-208 according to step 104 in FIG. 1A. The lower portion of the 2D array includes numbered rows and columns wherein a horizontal reference line 1 represents the first row and the respective column is also 1. The four mesh regions 202-208 define the vertical and horizontal extents of the earth model. Each mesh region includes horizontal curves, vertical curves and vertices at each intersection of a vertical curve and a horizontal curve. Some of these vertices are marked with a symbol for illustrating their position in the earth model relative to their position in the 2D array 200 illustrated in FIGS. 3-9. Only the vertices marked with a symbol are used to illustrate the method 100, which may be applied to all vertices in the earth model to achieve the same result.

Figure 3:
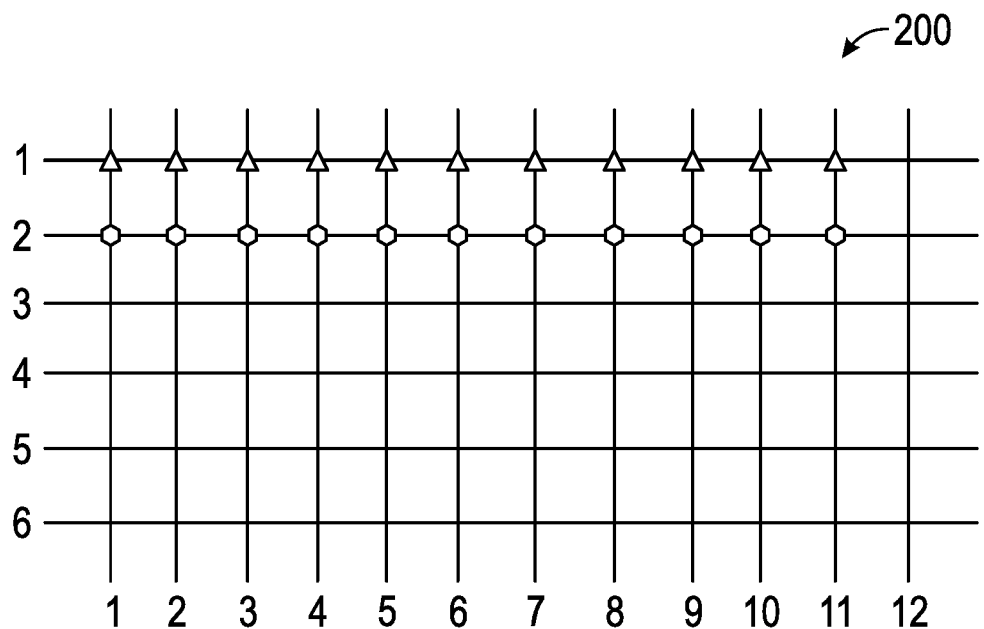
FIG. 3 is a lower portion of the 2D array in FIG. 2 illustrating steps 106-120 in FIGS. 1A-1B for two sets of vertices.

In FIG. 3, a lower portion of the 2D array 200 illustrates two sets of vertices mapped from the earth model to the 2D array 200 according to steps 106-120 in FIGS. 1A-1B. The first set of vertices (triangles) are marked on the 2D array 200 according to step 106 and the second set of vertices (hexagons) are marked on the 2D array according to step 108. A current curve (not shown) is formed by the second set of vertices according to step 110 and there are no unprocessed vertices between the current curve and the horizontal reference line 1 to process in step 114. Because there are no empty columns without a marked vertex between the second set of vertices, the method 100 proceeds to step 120 and the next set of vertices.

Figure 4:
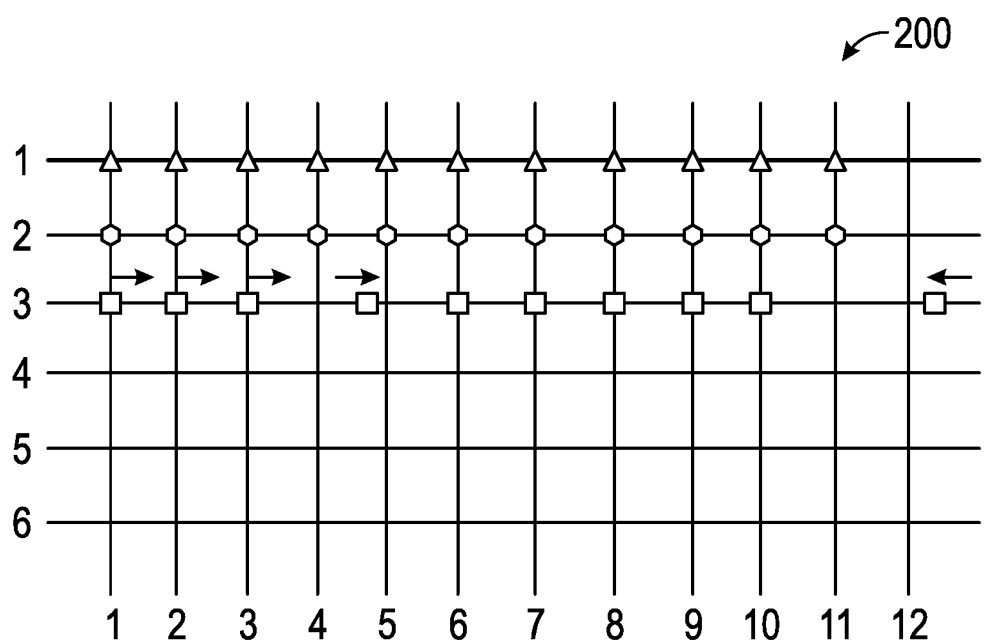
FIG. 4 is the lower portion of the 2D array in FIG. 2 illustrating another iteration of steps 108-116 in FIGS. 1A-1B for a third set of vertices.
Figure 5:
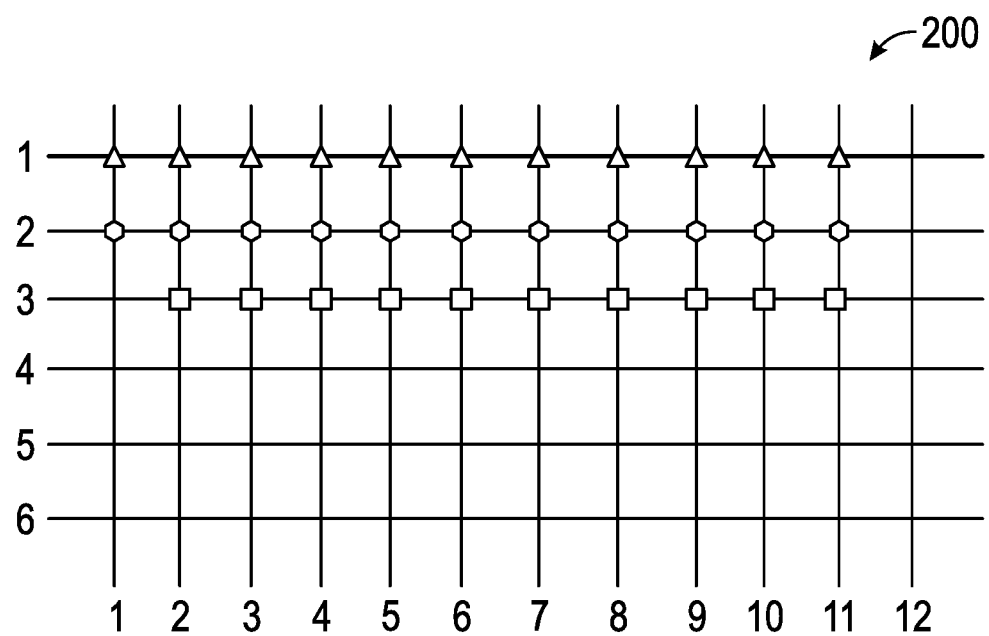
FIG. 5 is the lower portion of the 2D array in FIG. 2 illustrating steps 118-120 in FIG. 1B for the third set of vertices.

In FIG. 4, the lower portion of the 2D array 200 illustrates another iteration of steps 108-116 in FIGS. 1A-1B for a third set of vertices. The third set of vertices (squares) are marked on the 2D array 200 according to step 108. A current curve (not shown) is formed by the third set of vertices according to step 110. There are two unprocessed vertices between the current curve and the horizontal reference line 1, which are processed according to step 114 and marked in the third row, between columns four and five and to the right of column twelve, of the 2D array 200. Because there are empty columns without a marked vertex between the third set of vertices, the vertices in the third set with an arrow above are shifted in the direction of the arrow according to step 118. The 2D array 200 in FIG. 5 illustrates the result of step 118 for the third set of vertices. The method 100 proceeds to step 120 and the next set of vertices.

Figure 6:
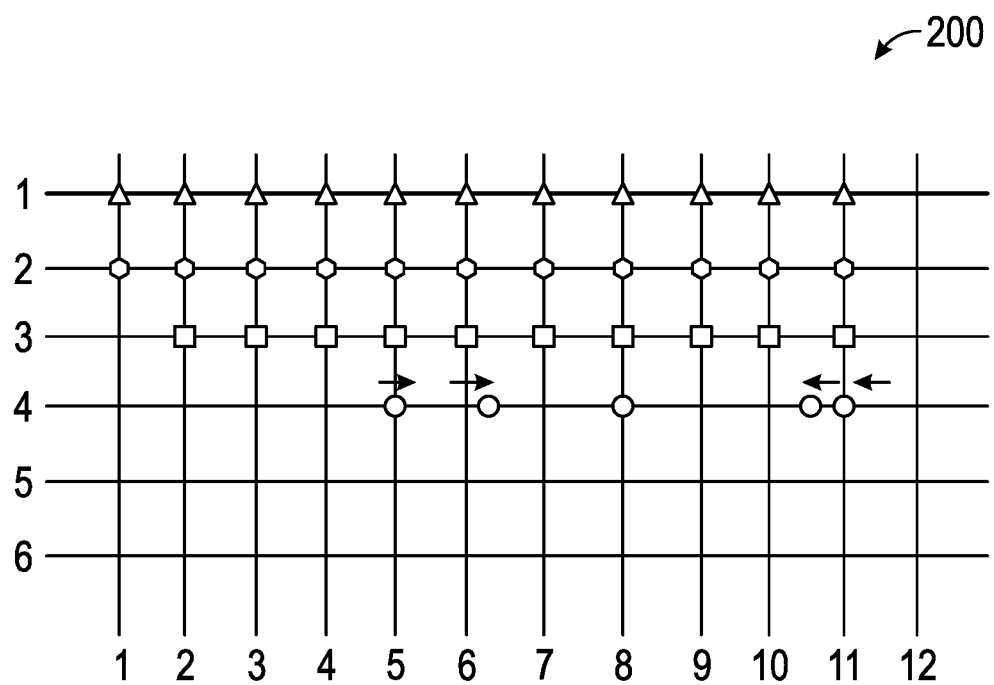
FIG. 6 is the lower portion of the 2D array in FIG. 2 illustrating another iteration of steps 108-116 in FIGS. 1A-1B for a fourth set of vertices.
Figure 7:
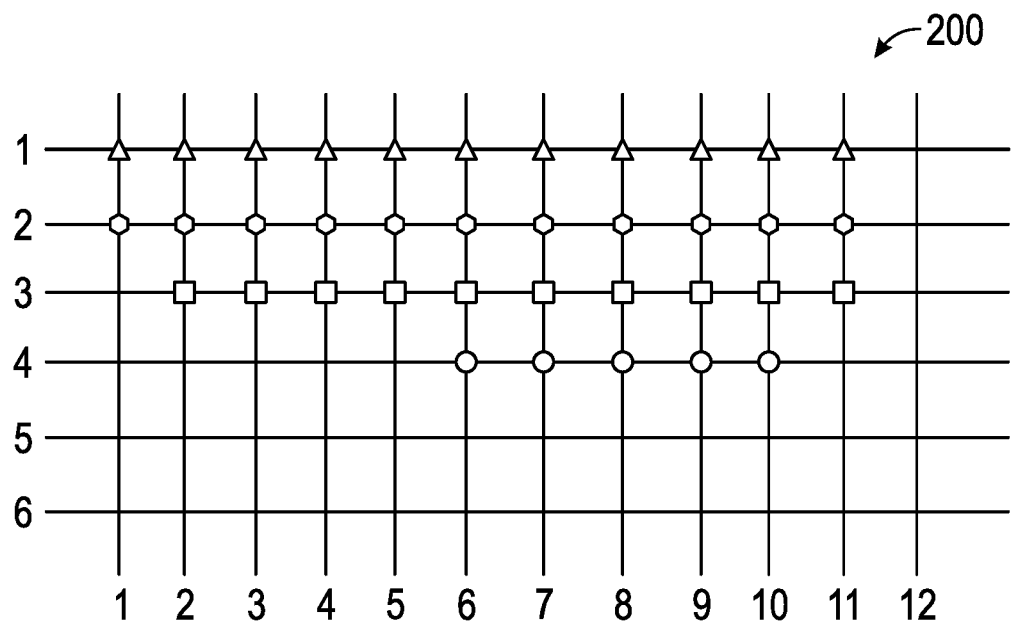
FIG. 7 is the lower portion of the 2D array in FIG. 2 illustrating steps 118-120 in FIG. 1B for the fourth set of vertices.

In FIG. 6, the lower portion of the 2D array 200 illustrates another iteration of steps 108-116 in FIGS. 1A-1B for a fourth set of vertices. The fourth set of vertices (circles) are marked on the 2D array 200 according to step 108. A current curve (not shown) is formed by the fourth set of vertices according to step 110. There are two unprocessed vertices between the current curve and the horizontal reference line 1, which are processed according to step 114 and marked in the fourth row, between columns six and seven and between columns ten and eleven, of the 2D array 200. Because there are empty columns without a marked vertex between the fourth set of vertices, the vertices in the fourth set with an arrow above are shifted in the direction of the arrow according to step 118. The 2D array 200 in FIG. 7 illustrates the result of step 118 for the fourth set of vertices. The method 100 proceeds to step 120 and the next set of vertices.

Figure 8:
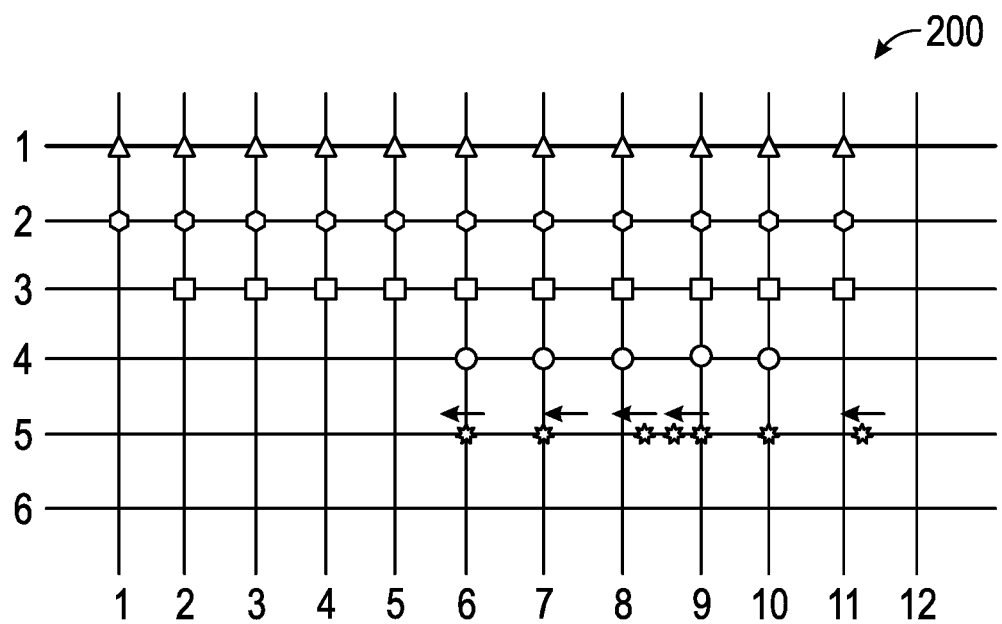
FIG. 8 is the lower portion of the 2D array in FIG. 2 illustrating another iteration of steps 108-116 in FIGS. 1A-1B for a fifth set of vertices.
Figure 9:
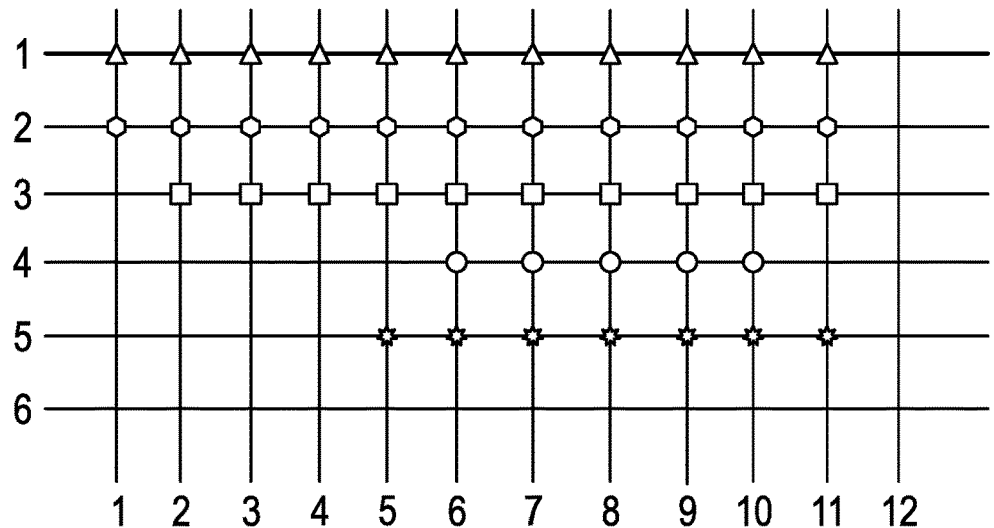
FIG. 9 is the lower portion of the 2D array in FIG. 2 illustrating steps 118-120 in FIG. 1B for the fifth set of vertices.

In FIG. 8, the lower portion of the 2D array 200 illustrates another iteration of steps 108-116 in FIGS. 1A-1B for a fifth set of vertices. The fifth set of vertices (stars) are marked on the 2D array 200 according to step 108. A current curve (not shown) is formed by the fifth set of vertices according to step 110. There are four unprocessed vertices between the current curve and the horizontal reference line 1, which are processed according to step 114. These unprocessed vertices are marked in the fifth row, between columns seven, eight and nine and to the right of column eleven, of the 2D array 200. Because there are empty columns without a marked vertex between the fifth set of vertices, the vertices in the fifth set with an arrow above are shifted in the direction of the arrow according to step 118. The 2D array 200 in FIG. 9 illustrates the result of step 118 for the fifth set of vertices.

While the method 100 solves a generic problem, it also may be used in the creation of a 2D array for a reverse-faulted area in an earth model and fluid simulation where 3D arrays can be built by a stack of optimized 2D arrays. The method 100 honors geometry and topology in the region before fault formation, which provides higher quality input data to the simulator. The method 100 avoids large equation system solving and heavy iteration computation by building a topology-geometry based link, from which it turns a 2D topology-geometry optimization problem into a set of 1D topology-geometry optimization problems. The method 100 therefore, vastly improves the processing speed of a computer simulation and produces a more accurate simulation. The 2D array formed by the method 100 may be used in the simulator to improve directional drilling operations.

System Description

The present disclosure may be implemented through a computer-executable program of instructions, such as program modules, generally referred to as software applications or application programs executed by a computer. The software may include, for example, routines, programs, objects, components and data structures that perform particular tasks or implement particular abstract data types. The software forms an interface to allow a computer to react according to a source of input. An earth modeling software application, such as DSG Earth Modeling marketed by Landmark Graphics Corporation, may be used as an interface application to implement the present disclosure. The software may also cooperate with other code segments to initiate a variety of tasks in response to data received in conjunction with the source of the received data. The software may be stored and/or carried on any variety of memory such as CD-ROM, magnetic disk, bubble memory and semiconductor memory (e.g. various types of RAM or ROM). Furthermore, the software and its results may be transmitted over a variety of carrier media such as optical fiber, metallic wire and/or through any of a variety of networks, such as the Internet.

Moreover, those skilled in the art will appreciate that the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof, in a computer system or other processing system.

Figure 10:
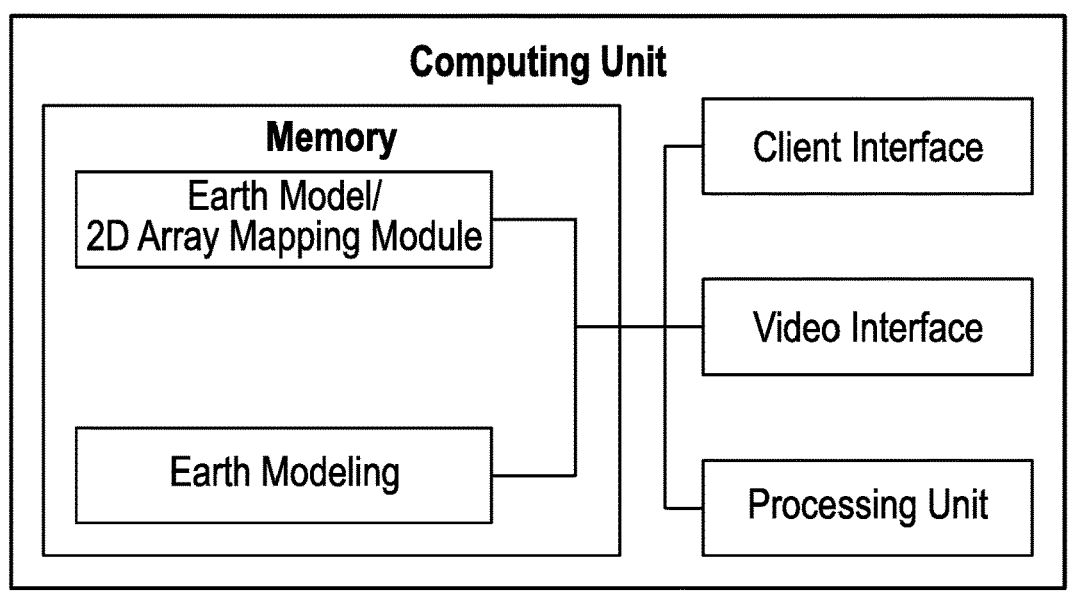
FIG. 10 is a block diagram illustrating one embodiment of a computer system for implementing the present disclosure

Referring now to FIG. 10, a block diagram illustrates one embodiment of a system for implementing the present disclosure on a computer. The system includes a computing unit, sometimes referred to as a computing system, which contains memory, application programs, a client interface, a video interface, and a processing unit. The computing unit is only one example of a suitable computing environment and is not intended to suggest any limitation as to the scope of use or functionality of the disclosure.

The memory primarily stores the application programs, which may also be described as program modules containing computer-executable instructions, executed by the computing unit for implementing the present disclosure described herein and illustrated in FIGS. 2-9. The memory therefore, includes an earth model/2D array mapping module, which enables steps 102-120 described in reference to FIGS. 1A-1B. The earth model/2D array mapping module may integrate functionality from the remaining application programs illustrated in FIG. 10. In particular, the earth modeling application may be used as an interface application to supply the earth model is step 104 and display the 2D array and/or the earth model used in steps 102-120. Although the earth modeling application may be used as interface application, other interface applications may be used, instead, or the earth model/2D array mapping module may be used as a stand-alone application.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on, the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well-known.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

What is claimed:

1. A method for mapping vertices from an earth model to a 2D array, comprising:
   a) aligning the earth model and the 2D array, wherein the earth model comprises a plurality of horizontal curves, a plurality of vertical curves and vertices at each intersection of a vertical curve and a horizontal curve;
   b) processing each vertex on a respective vertical curve that is nearest an intersection of a horizontal reference line in the 2D array and the respective vertical curve by marking a point representing the vertex on the reference line, which represents a first row of the 2D array, and in a respective column;
   c) processing each next unprocessed vertex on the respective vertical curve that each respective vertex was processed in one of step (b) and at least one of steps (c) and (e) by marking a respective point representing each next vertex on another respective horizontal line in the 2D array, which represents a next respective row of the 2D array, and in the respective column that a nearest processed vertex on the respective vertical curve is marked;
   d) forming at least one current curve;
   e) processing each unprocessed vertex between each respective current curve and the reference line by marking a respective point representing each unprocessed vertex on the another respective horizontal line in the 2D array on which the vertices processed in one of steps (b) and step (c) on a same side of the reference line are marked, at a unique position;
   f) reducing an amount of computer memory required to store the 2D array by optimizing a spacing between the vertices marked in each another respective horizontal line from steps (c) and (e) with an empty column; and
repeating steps (c) through (f) using a computer processor until there are no more unprocessed vertices.

2. The method of claim 1, wherein the earth model and the 2D array are aligned by positioning the 2D array over the earth model so that each vertical extent and each horizontal extent of the 2D array is nearest to each respective vertical extent and each respective horizontal extent of the earth model.

3. The method of claim 2, wherein the vertical extents and the horizontal extents of the earth model are defined by one or more mesh regions representing the earth model.

4. The method of claim 1, wherein each current curve is formed by:
   connecting each vertex in the earth model that is marked in each same next respective row of the 2D array; and
   extrapolating each current curve to each horizontal extent of the earth model.

5. The method of claim 4, wherein there is at least one vertex in the earth model that is marked in each same next respective row of the 2D array.

6. The method of claim 1, wherein each current curve is formed using each horizontal line in the 2D array on opposite sides of the reference line that is closest to the reference line without any processed vertices on a respective side of the reference line that are farther from the reference line than the respective horizontal line on a same side of the reference line.

7. The method of claim 1, wherein a spacing between the vertices marked in each another respective horizontal line from steps (c) and (e) with an empty column is optimized by shifting one or more of the marked vertices to occupy each empty column without creating another empty column between the marked vertices.

8. The method of claim 1, wherein the earth model is based on a global coordinate system and the 2D array is based on another global coordinate system.

9. The method of claim 8, wherein the coordinate system for the earth model is an image coordinate system and the coordinate system for the 2D array is a world coordinate system.

10. A non-transitory program carrier device tangibly carrying computer executable instructions for mapping vertices from an earth model to a 2D array, the instructions being executable to implement:
   a) aligning the earth model and the 2D array, wherein the earth model comprises a plurality of horizontal curves, a plurality of vertical curves and vertices at each intersection of a vertical curve and a horizontal curve;
   b) processing each vertex on a respective vertical curve that is nearest an intersection of a horizontal reference line in the 2D array and the respective vertical curve by marking a point representing the vertex on the reference line, which represents a first row of the 2D array, and in a respective column;
   c) processing each next unprocessed vertex on the respective vertical curve that each respective vertex was processed in one of step (b) and at least one of steps (c) and (e) by marking a respective point representing each next vertex on another respective horizontal line in the 2D array, which represents a next respective row of the 2D array, and in the respective column that a nearest processed vertex on the respective vertical curve is marked;
   d) forming at least one current curve;
   e) processing each unprocessed vertex between each respective current curve and the reference line by marking a respective point representing each unprocessed vertex on the another respective horizontal line in the 2D array on which the vertices processed in one of steps (b) and step (c) on a same side of the reference line are marked, at a unique position;
   f) reducing an amount of computer memory required to store the 2D array by optimizing a spacing between the vertices marked in each another respective horizontal line from steps (c) and (e) with an empty column; and
repeating steps (c) through (f) using a computer processor until there are no more unprocessed vertices.

11. The program carrier device of claim 10, wherein the earth model and the 2D array are aligned by positioning the 2D array over the earth model so that each vertical extent and each horizontal extent of the 2D array is nearest to each respective vertical extent and each respective horizontal extent of the earth model.

12. The program carrier device of claim 11, wherein the vertical extents and the horizontal extents of the earth model are defined by one or more mesh regions representing the earth model.

13. The program carrier device of claim 10, wherein each current curve is formed by:
 connecting each vertex in the earth model that is marked in each same next respective row of the 2D array; and
 extrapolating each current curve to each horizontal extent of the earth model.

14. The program carrier device of claim 13, wherein there is at least one vertex in the earth model that is marked in each same next respective row of the 2D array.

15. The program carrier device of claim 10, wherein each current curve is formed using each horizontal line in the 2D array on opposite sides of the reference line that is closest to the reference line without any processed vertices on a respective side of the reference line that are farther from the reference line than the respective horizontal line on a same side of the reference line.

16. The program carrier device of claim 10, wherein a spacing between the vertices marked in each another respective horizontal line from steps (c) and (e) with an empty column is optimized by shifting one or more of the marked vertices to occupy each empty column without creating another empty column between the marked vertices.

17. The program carrier device of claim 10, wherein the earth model is based on a global coordinate system and the 2D array is based on another global coordinate system.

18. The program carrier device of claim 17, wherein the coordinate system for the earth model is an image coordinate system and the coordinate system for the 2D array is a world coordinate system.

19. A non-transitory program carrier device tangibly carrying computer executable instructions for mapping vertices from an earth model to a 2D array, the instructions being executable to implement:

a) aligning the earth model and the 2D array by positioning the 2D array over the earth model so that each vertical extent and each horizontal extent of the 2D array is nearest to each respective vertical extent and each respective horizontal extent of the earth model for mapping vertices from an earth model to a 2D array, wherein the earth model comprises a plurality of horizontal curves, a plurality of vertical curves and vertices at each intersection of a vertical curve and a horizontal curve;
 b) processing each vertex on a respective vertical curve that is nearest an intersection of a horizontal reference line in the 2D array and the respective vertical curve by marking a point representing the vertex on the reference line, which represents a first row of the 2D array, and in a respective column;
 c) processing each next unprocessed vertex on the respective vertical curve that each respective vertex was processed in one of step (b) and at least one of steps (c) and (e) by marking a respective point representing each next vertex on another respective horizontal line in the 2D array which represents a next respective row of the 2D array, and in the respective column that a nearest processed vertex on the respective vertical curve is marked;
 d) forming at least one current curve;
 e) processing each unprocessed vertex between each respective current curve and the reference line by marking a respective point representing each unprocessed vertex on the another respective horizontal line in the 2D array on which the vertices processed in one of steps (b) and step (c) on a same side of the reference line are marked, at a unique position;
 f) reducing an amount of computer memory required to store the 2D array by optimizing a spacing between the vertices marked in each another respective horizontal line from steps (c) and (e) with an empty column;
 g) repeating steps (c) through (f) using a computer processor until there are no more unprocessed vertices.

20. The program carrier device of claim 19, wherein the vertical extents and the horizontal extents of the earth model are defined by one or more mesh regions representing the earth model.

* * * * *